US010552687B2

(12) United States Patent
Allen et al.

(10) Patent No.: US 10,552,687 B2
(45) Date of Patent: Feb. 4, 2020

(54) VISUAL MONITORING OF QUEUES USING AUXILLARY DEVICES

(71) Applicant: INTERNATIONAL BUSINESS MACHINES CORPORATION, Armonk, NY (US)

(72) Inventors: Ira L. Allen, Dallas, TX (US); Russell P. Bobbitt, New York, NY (US); Rogerio S. Feris, Hartford, CT (US); Yun Zhai, Pound Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/107,333

(22) Filed: Aug. 21, 2018

(65) Prior Publication Data
US 2018/0357492 A1 Dec. 13, 2018

Related U.S. Application Data

(63) Continuation of application No. 15/232,189, filed on Aug. 9, 2016, now Pat. No. 10,102,431, which is a continuation of application No. 13/840,368, filed on Mar. 15, 2013, now Pat. No. 9,443,148.

(51) Int. Cl.
*G06K 9/00* (2006.01)
*H04N 7/18* (2006.01)

(52) U.S. Cl.
CPC ......... *G06K 9/00771* (2013.01); *H04N 7/188* (2013.01)

(58) Field of Classification Search
None
See application file for complete search history.

(56) References Cited

U.S. PATENT DOCUMENTS

| 5,953,055 | A | 9/1999 | Huang et al. |
| 6,295,367 | B1 | 9/2001 | Crabtree et al. |
| 6,998,987 | B2 | 2/2006 | Lin |
| 7,151,454 | B2 | 12/2006 | Washington |
| 7,929,017 | B2 | 4/2011 | Aggarwal et al. |
| 8,081,215 | B2 | 12/2011 | Kuo et al. |

(Continued)

FOREIGN PATENT DOCUMENTS

| JP | 2007241669 | 9/2007 |
| JP | 2011164812 | 8/2011 |

OTHER PUBLICATIONS

Biagioni, J. et al., "EasyTracker: Automatic Transit Tracking, Mapping, and Arrival Time Prediction Using Smartphones", SenSys '11, Nov. 1-4, 2011, 14 pages.

*Primary Examiner* — Frederick D Bailey
(74) *Attorney, Agent, or Firm* — James Nock; Andrew M. Calderon; Roberts Mlotkowski Safran, Cole & Calderon, P.C.

(57) ABSTRACT

Methods and system are provided for monitoring a queue. A method includes receiving by sensors a non-visual identifier at predefined locations of a queue. Further, the method includes capturing by image capture devices images of an object possessing the non-visual identifier at the predefined locations of the queue. Further, the method includes visually tracking another object in the queue based on transformations of a predefined feature extracted from the images of the object possessing the non-visual identifier at the predefined locations.

20 Claims, 7 Drawing Sheets

(56) References Cited

U.S. PATENT DOCUMENTS

| | | |
|---|---|---|
| 8,233,043 B2 | 7/2012 | Washington |
| 2003/0052971 A1 | 3/2003 | Gutta et al. |
| 2003/0053658 A1 | 3/2003 | Pavlidis |
| 2005/0117778 A1 | 6/2005 | Crabtree |
| 2005/0146417 A1 | 7/2005 | Sweatte |
| 2005/0207617 A1 | 9/2005 | Samoff |
| 2007/0097211 A1 | 5/2007 | Washington |
| 2007/0222595 A1 | 9/2007 | Motteram et al. |
| 2007/0273514 A1 | 11/2007 | Winand et al. |
| 2009/0059007 A1* | 3/2009 | Wagg ................. G06K 9/00369 348/157 |
| 2009/0141941 A1 | 6/2009 | Wagg |
| 2009/0222388 A1 | 9/2009 | Hua et al. |
| 2009/0225164 A1 | 9/2009 | Renkis |
| 2009/0296989 A1 | 12/2009 | Ramesh et al. |
| 2009/0310821 A1 | 12/2009 | Connell, II |
| 2010/0232643 A1 | 9/2010 | Chen et al. |
| 2011/0170744 A1 | 7/2011 | Malinovskiy et al. |
| 2013/0155229 A1* | 6/2013 | Thornton ................. H04N 7/18 348/143 |
| 2013/0223678 A1* | 8/2013 | Brunetti ............. G06K 9/00778 382/103 |

\* cited by examiner

FIG. 5

Object A
Location: 0, 0
Time: 00:10:00

| f1 |
| f2 |
| f3 |
| ... |
| fx |

Object A
Location: 1,2
Time: 00:10:18

| f1 |
| f2 |
| f3 |
| ... |
| fx |

Object A
Location: 2,1
Time: 00:10:21

| f1 |
| f2 |
| f3 |
| ... |
| fx |

Object A
Location: 9,7
Time: 00:10:35

| f1 |
| f2 |
| f3 |
| ... |
| fx |

FIG. 6

| Location | Adjacent Loc. | Feature | Change | Feature | Change | Feature | Change |
|---|---|---|---|---|---|---|---|
| 0,0 | 0,1 | f1 | | f2 | | f3 | |
| ... | ... | | | | | | |
| 1,2 | 1,1 | f1 | | f2 | | f3 | |
| 1,2 | 0,2 | f1 | | f2 | | f3 | |
| 1,2 | 1,1 | f1 | | f2 | | f3 | |
| 1,2 | 1,2 | f1 | | f2 | | f3 | |
| 1,2 | 2,1 | f1 | | f2 | | f3 | |
| 1,2 | 2,2 | f1 | | f2 | | f3 | |
| ... | ... | | | | | | |
| 9,7 | 8,6 | f1 | | f2 | | f3 | |
| 9,7 | 8,6 | f1 | | f2 | | f3 | |

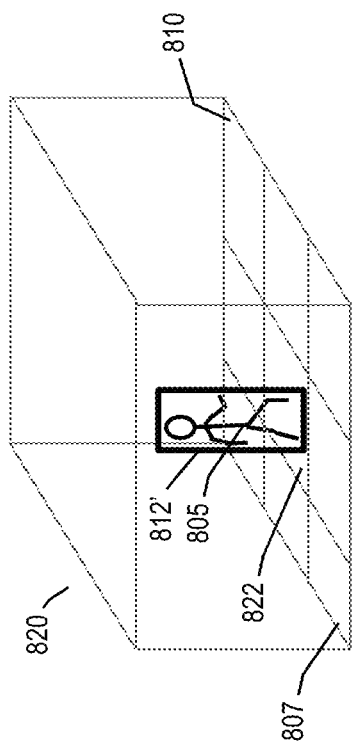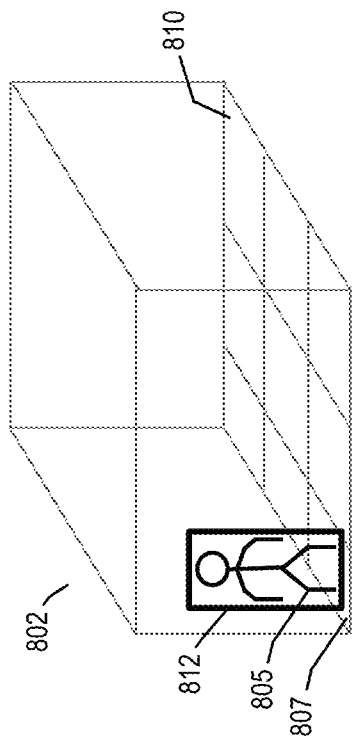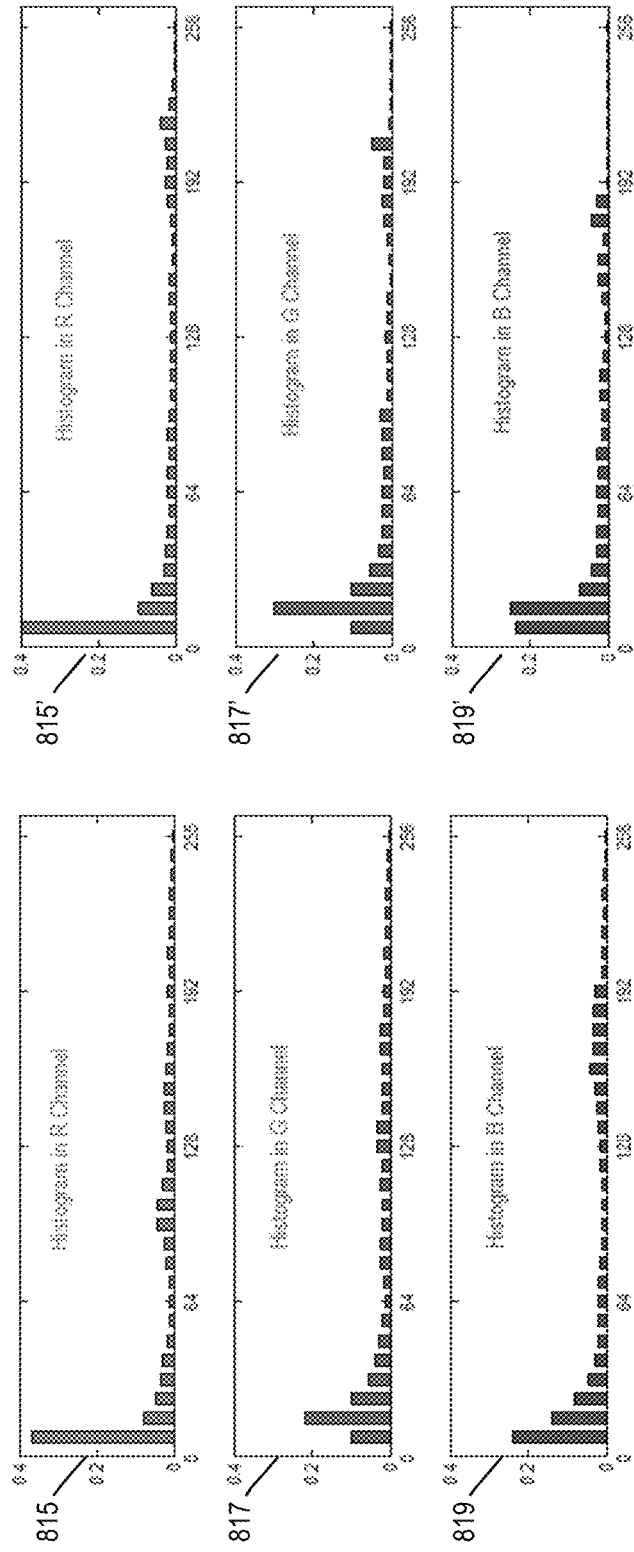
FIG. 8
FIG. 7

VISUAL MONITORING OF QUEUES USING AUXILLARY DEVICES

FIELD OF THE INVENTION

The present invention generally relates to capturing information in a scene and, more particularly, to methods and systems for tracking movements of objects in a scene.

BACKGROUND

Transportation hubs, such as airports, use a variety of methods to track passengers in queues. For example, an airport may include an identifier (e.g., bar code or radio-frequency identification (RFID)) on passengers' boarding passes in order to estimate the moving speed of a boarding queue by scanning the identifier at the entry and the exit points of the queue. However, all passengers may not possess an identifier that can be tracked.

In some systems, the movement of passengers at transportation hubs may be tracked using their cellular devices. For example, transmissions from these devices to a local computer network via infrared (IR) or radio frequencies (RF) signals may include an identifier of a cellular device and/or a passenger that can be tracked though a queue. However, passengers may not possess a cellular device that can transmit such an identifier.

SUMMARY

In a first aspect of the invention there is a method for monitoring a queue. The method includes receiving by sensors a non-visual identifier at predefined locations of a queue. Further, the method includes capturing by image capture devices images of an object possessing the non-visual identifier at the predefined locations of the queue. Further, the method includes visually tracking another object in the queue based on transformations of a predefined feature extracted from the images of the object possessing the non-visual identifier at the predefined locations.

In another aspect of the invention, a system for visually monitoring a queue includes a computing device communicatively linked to one or more non-visual sensors and one or more image capture devices. The computing device detects an object at an entrance of the queue. Further, based on a determination that the one or more non-visual sensors did not receive a non-visual identifier from the object, the computing device visually tracks the object in the queue using a feature transformation map.

In an additional aspect of the invention, a computer program product for monitoring a queue is provided. The computer program product includes one or more computer-readable, tangible storage devices and program instructions, stored on the storage devices, that detect an object at an entrance of the queue. Further, the computer program product includes program instructions that determine whether a non-visual sensor received a non-visual identifier from the object at the entrance. Further, the computer program product includes program instructions that visually track the object in the queue using a feature transformation map based on a determination that non-visual identifier was not received from the object at the entrance. Further, the computer program product includes program instructions that update the feature transformation map based on a determination that the non-visual identifier was received from the object at the entrance.

In a further aspect of the invention, a computer system for monitoring a queue, the system comprises a CPU, a computer readable memory, and a computer readable storage media. Additionally, the system includes program instructions to determine that a non-visual sensor received an identification from an object having a non-visual identifier. Further, the system includes program instructions program instructions to capture an image of the object at the entrance of the queue. Further, the system includes program instructions to visually identify the object in the queue based on the image of the object captured at the entrance to the queue. Further, the system includes program instructions to capture images of the object at adjacent locations of the queue. Further, the system includes program instructions to extract features from the images of the object captured at the adjacent locations of the queue. Further, the system includes program instructions to determine differences the features. Further, the system includes program instructions to update a feature transformation map using the differences determined in the features by combining the differences determined in the features with previously determined differences in the features extracted from images of the objects captured at the adjacent locations of the queue. Each of the program instructions are stored on the computer readable storage media for execution by the CPU via the computer readable memory.

In a further aspect of the invention, a method is provided for deploying a system for monitoring a queue. The method includes providing a computer infrastructure, being operable to identify an individual entering a queue that does not possess a non-visual identifier. Further, the method includes providing the computer infrastructure, being operable to track the identified individual in the queue using image capture devices, wherein tracking comprises: capturing an image of the individual at a first predefined location in the queue, extracting features of the individual from the captured image; and comparing the features with corresponding features extracted from images captured at other predefined locations adjacent to the first predefined location based on a feature transformation map.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 5 shows exemplary data structures including features extracted from a captured image in accordance with aspects of the invention.

FIG. 6 shows an exemplary data structure including a feature transformation map in accordance with aspects of the invention.

FIG. 7 shows exemplary histogram features extracted from an image captured in a queue in accordance with aspects of the invention.

FIG. 8 shows exemplary histogram features from an extracted image captured in a queue in accordance with aspects of the invention.

DETAILED DESCRIPTION

Figure 1:
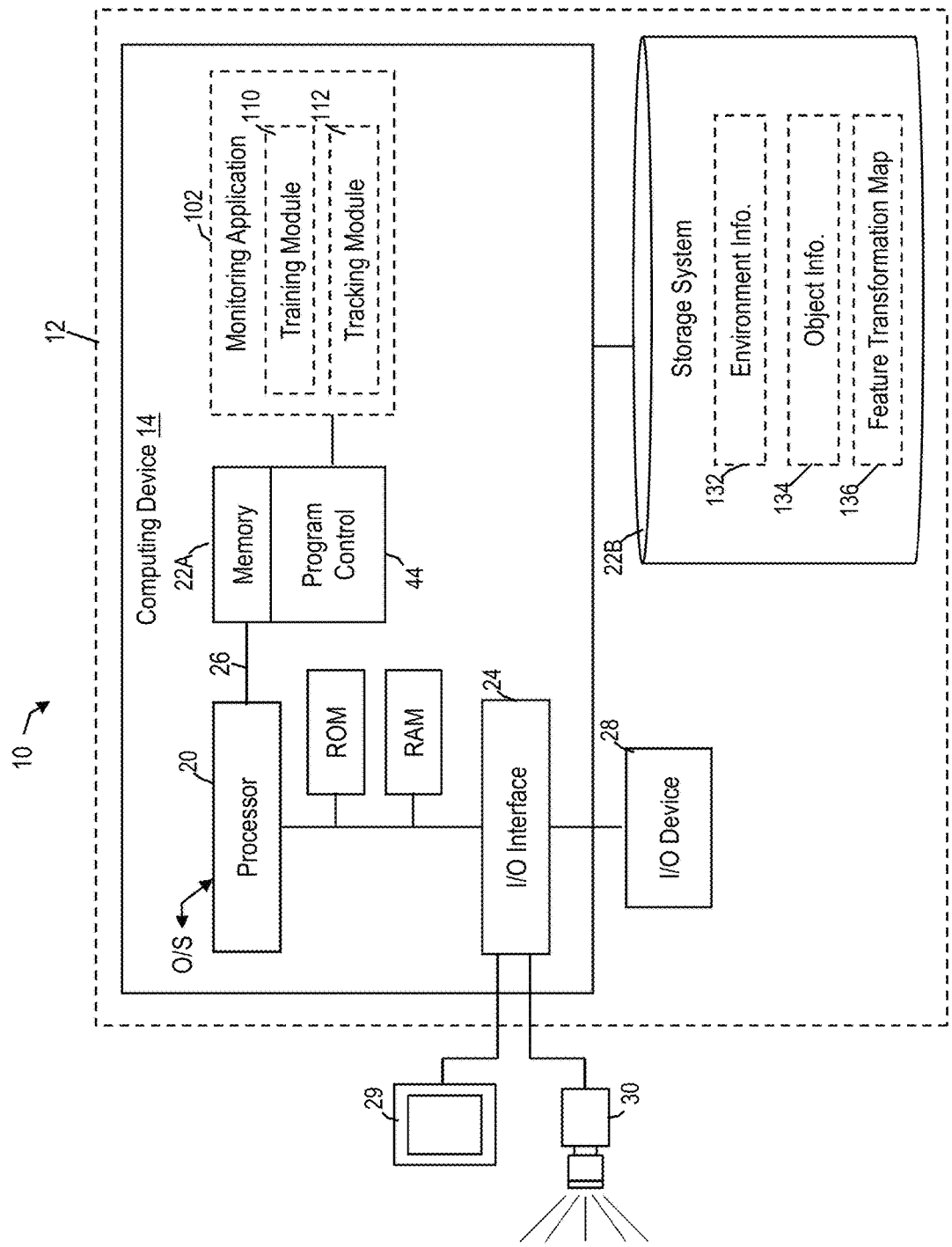
FIG. 1 is an illustrative system environment for implementing the steps in accordance with aspects of the invention.

The present invention generally relates to capturing information in a scene and, more particularly, to methods and systems for tracking movements of objects in a scene. According to aspects of the invention, non-visual identifiers are used to build models for visually monitoring a queue. The non-visual identifiers provide accurate localization of some objects tracked by a monitoring system. The accurate localization information is used to generate a feature transformation map of visual features at different locations within the queue. The feature transformation map models changes in the features of objects instead of modeling the actual feature values. The feature transformation map provides a spatial context aware network (e.g., from a location A to a location B) that builds relationships between the features at two locations with some probabilistic measures, if necessary. Using the feature transformation map, the monitoring system accurately localizes other objects in the queue that do not possess a non-visual identifier using their only visual features. By doing so, every object in a queue can be accurately monitored, even in crowded environments in which purely visual tracking would otherwise be inaccurate.

In exemplary embodiments, an individual in a queue (e.g., a passenger rope line at an airport terminal) possesses a non-visual identifier (e.g., an identification included in a barcode). The non-visual identifier is received by a monitoring system when the individual enters and/or exits the queue. Additionally, the individual's image is captured at the entrance and/or exit. Features of the individual are extracted from the captured images and stored in association with the identifier. As the individual traverses the queue, additional images of the individual are captured. Because the individual has been uniquely identified when the individual entered the queue, localization of that individual in the queue can be accurately accomplished, even in a crowd of people. Changes in visual features of the individual extracted from the captured images (e.g. size, proportion, orientation, color) are determined as the user moves from one location to the next in the queue. These changes are used to create a feature transformation map that models changes in features that occur between adjacent locations in the queue (e.g., relative changes in size, proportion, orientation, color, etc.). Since other individuals that pass through the queue will follow a similar path, similar changes will occur in the features of images captured from these individuals. The feature transformation map thereby allows accurate visual tracking of the queue for an individual that does not possess a non-visual identifier. As such, visual monitoring of all individuals entering the queue can be performed, even in crowds.

The examples described herein are directed to people, such as queues in airport environments (e.g., check-in lines, security lines, boarding lines, etc.). However, embodiments of the invention are not limited to these examples and, instead, may be implemented in any type of environment in which people, vehicles, or other objects traverse a queue. For example, embodiments may be implemented in other public places where people usually form lines (e.g., theme parks, stadiums, etc.) Further, embodiments may be implemented situations like highways, where vehicle congestion is often observed. For example, a highway environment may include vehicles queuing at a toll plaza wherein some vehicles have payment transponders and others do not. In this case, auxiliary sensor signals (RF signals of the drivers/passengers in the cars) can enhance the localization and tracking of vehicles, and consequently the congestion level and behavior of individual vehicles can be reliably analyzed.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server or other computing system 12 that can perform the processes described herein. In particular, server 12 includes a computing device 14. Computing device 14 can be resident on a network infrastructure or computing device of a third party service provider (any of which is generally represented in FIG. 1).

Computing device 14 also includes a processor 20, memory 22A, an I/O interface 24, and a bus 26. Memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

Computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. External I/O device/resource 28 may be, for example, a handheld device, PDA, handset, keyboard, etc. Additionally, in accordance with aspects of the invention, computing device 14 is in communication with one or more sensors 29 and one or more image capture devices 30. Sensors 29 can be any devices that receive non-visual information (e.g., encoded information), such as a bar codes, radio-frequency identifiers (e.g., RFID), biometric identifiers (e.g., fingerprint scans), etc. Image capture devices 29 can be any devices (e.g., cameras) that capture visual images in the form of photographs, movie film, or videos.

In general, processor 20 executes computer program code (e.g., program control 44), which can be stored in memory 22A and/or storage system 22B. Moreover, in accordance with aspects of the invention, program control 44 controls a monitoring application 102, which performs the processes described herein. Monitoring application 102 can be implemented as one or more program code in program control 44 stored in memory 22A as separate or combined modules. Additionally, monitoring application 102 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. Bus 26 provides a communications link between each of the components in computing device 14.

In accordance with aspects of the invention, monitoring application 102 configures computing system 12 to monitor queues using sensors 29 and cameras 30. Monitoring application 102, in accordance with aspects of the invention, includes a training module 110 and a tracking module 112. Training module 110 is hardware, software, or a combination thereof that generates a feature transformation map 136 by tracking objects possessing non-visual identifiers (e.g., barcodes, RFIDs). In embodiments, training module 110 receives a non-visual identifier from sensors 29 at an entrance and/or exit of a queue and captures an image of an object (e.g., a passenger) that is associated with the non-visual signal using image capture device 30. In embodiments, training module 110 uses existing techniques (e.g. the AdaBoost learning algorithm) that, for example, incorporate weaker object classifiers to build strong overall classifiers. The extracted features of the captured objects (e.g., color, size, etc.) can be fed to a training process as the weak classifiers. As a result, a strong overall passenger detection classifier is constructed by incorporating the reliable object attributes of the subjects who are associated with non-visual signal sources, e.g., RFID.

Information describing the queue (e.g., size, locations, entrance location, and exit location) may be stored as queue information 132 in storage system 22B. Training module 110 extracts a set of predefined features of the object from the captured image of the object at the entrance of the queue. The extracted features may be stored in stored system 22B as a record in object information 134. Subsequently, training module 110 tracks the object by capturing images of the object at locations (e.g., grid segments) in the queue and extracting features from the captured images. Based on changes in the extracted features that occur between each location, training module 110 generates or updates feature transformation map 136, which may be stored in storage system 22B.

Tracking module 112 is hardware, software, or a combination thereof that visually tracks objects in a queue that do not provide a non-visual identifier. For example, in embodiments, as objects enter, traverse, and exit a queue, tracking module 112 tracks the objects by capturing images at different locations (e.g., grid segments) defined by environment information 132, and extracts features of the objects from the captured images. Each location may be associated with information in feature transformation map 136, which models changes in the features of objects between adjacent locations. Thus, all objects in the queue can be tracked as they move based on changes in the images captured at different locations.

Computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
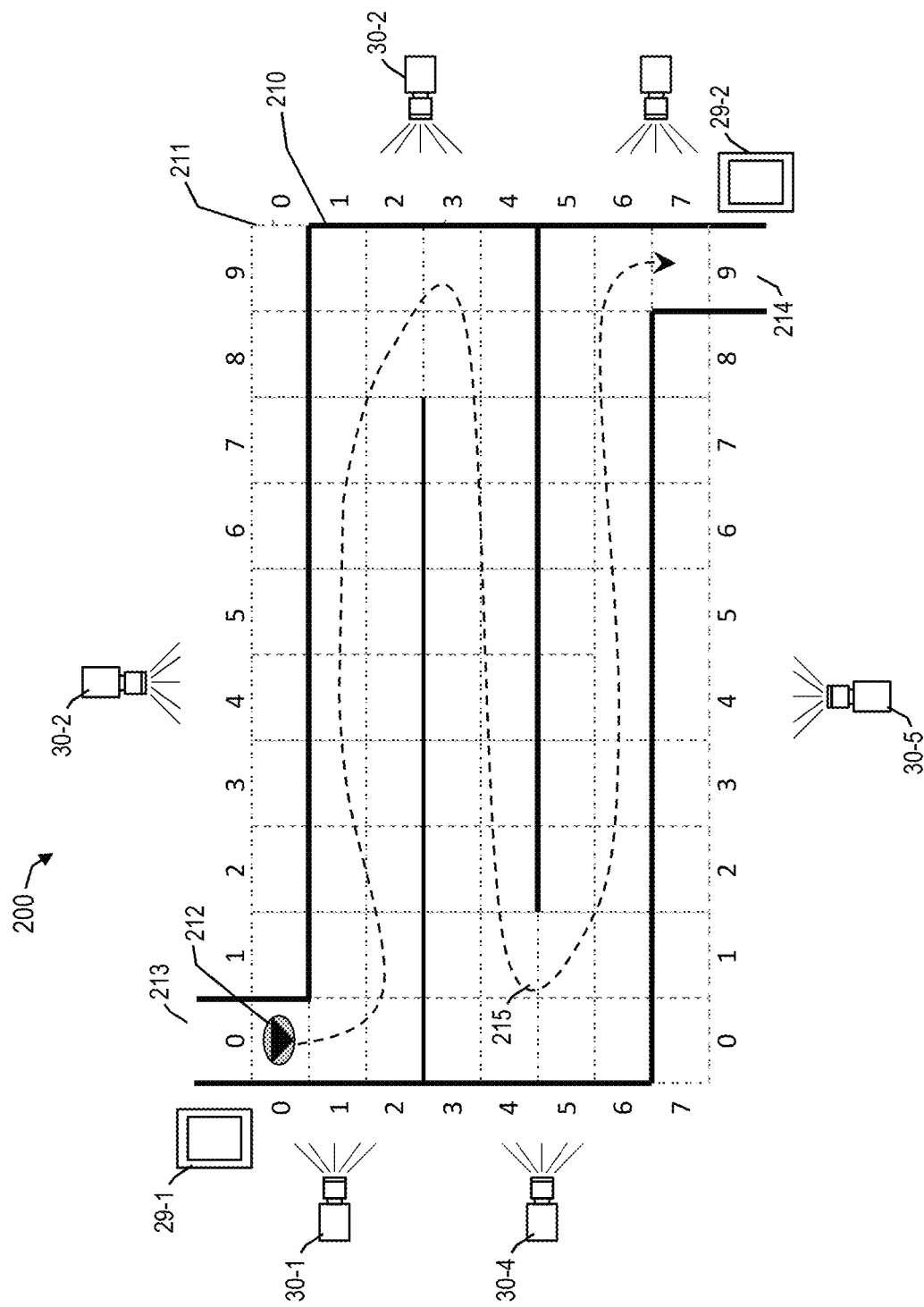
FIG. 2 is an illustrative operational environment for implementing systems and processes in accordance with aspects of the invention.

FIG. 2 is an illustrative operational environment 200 for implementing systems and processes in accordance with aspects of the invention. As shown in FIG. 2, operational environment 200 includes a queue 210 overlaid by a grid 211 in which an object 212 travels along a path 215 between an entrance 213 and an exit 214. In accordance with aspects of the invention, a monitoring system (e.g., computing device 14 executing monitoring application 102) tracks object 212 in queue 210 using sensors 29-1 and 29-2 and/or image capture devices 30-1 . . . 30-6. While FIG. 2 illustrates a single object 212 (e.g., packages) for the sake of explanation, many such objects may travel through the queue serially and/or in parallel along different paths.

Queue 210 is a structured area defining a path having a predefined entrance and exit. In environment 200, queue 210 is a surface on which object 212 travels in two-dimensions (e.g., with three degrees of freedom). For example, queue may be a sidewalk, a rope line, a street, a parking lot, a conveyer, and the like. Environment 200, however, is not limited to surfaces and, instead, may be a tube for example in which object 212 travels in three-dimensions (e.g., six degrees of freedom).

According to embodiments, queue 210 is divided into grid 211, wherein each segment of the grid defines a location in the queue. Grid 211 may be demarked physically (e.g., visible lines on a surface) or virtually (e.g., a computer-generated overlay in environment information 132). As such, in FIG. 2, grid 211 is a 10×8 grid (i.e., 0 . . . 9×0 . . . 7), where each location (i.e., segment) can be referenced by pair of values. For example, entrance 212 is at location 0,0 and exit 214 is at location 7,9. Parameters of queue 210, including locations of sensors 29, cameras 30, entrance 212, exit 213, locations of grid 211, and their interrelationships may be predefined as environment information (e.g., environment information 132). Grid 211 is not limited to the example given and may include any number of segments (e.g., 1000×1000) having any size and/or granularity of granularity (e.g., 1'×2' segments).

The object 212 may be a person, a vehicle, an item, or the like. In accordance with aspects of the invention some, but not all objects may possess a non-visual identifier. As used herein, the term non-visual identifier means machine-readable information (e.g., numbers, letters, bar codes, radio identification (e.g., RFIDs), biometrics, ROMs, etc.); however, it is not intended to exclude machine-readable information that can be visually recognized (e.g., barcodes).

In accordance with aspects of the invention, sensors 29 are located at entrance 213 and/or exit 214 of queue 210 for receiving non-visual identifiers from objects (e.g., object 212) and providing the non-visual identifier to the monitoring system (e.g., computing system 12 via I/O device 24). In embodiments, additional sensors 29 may be placed at other locations within the queue (e.g., at a halfway point, checkpoints, or a chokepoints). This provides an advantage of building a more comprehensive representation of the passengers, so that training of the feature transformation map (e.g., vision algorithms) can be more reliable.

Image capture devices 30 are located around queue 210 for capturing images of objects (e.g., object 212) and providing the captured images to the monitoring system (e.g., via I/O device 24). In embodiments, image capture devices 30-1 . . . 30-6 are distributed and arranged such that their combined field of view encompasses the entire queue 210. Each image capture device 30-1 . . . 30-6 may monitor a predefined set of locations in grid 211. For example, image capture device 30-1 may be associated with grid locations 0,0 . . . 2,2. These associations may be predefined (e.g., stored as environment information 132). For example, image capture devices 30-1 and 30-6 may be calibrated so that the monitoring system knows the locations of entrance 213 and exit 214. While FIG. 2 is a two-dimensional drawing, it should be understood that the cameras may be placed at height above queue 210 such that their respective fields of views of the entirely blocked by objects, items or structures.

According to aspects of the invention, object 212 enters queue 210 at entrance 213. If object 212 possesses (e.g., holds, includes, or incorporates) a non-visual identifier, the monitoring system captures and identifies the non-visual identifier using sensor 29-1. In embodiments, sensors 29-1 and 29-2 capture the non-visual identifier automatically without action by the object. For example, sensors 29-1 and 29-2 may automatically receive the non-visual identifier from an RFID attached to a passenger's boarding pass. Alternatively, sensors 29-1 and 29-2 may capture the non-visual identifier in response to a trigger (e.g., detecting a bar code, reading a RFID, etc.).

In response to receiving the non-visual identifier, the monitoring system triggers a training module (e.g., training module 110 of monitoring application 102 executed by computing system 12) to capture an image of the object at entrance 213 of queue 210. The training module extracts features of the object from the captured image. Some example features are size, shape, and color. In the case of person, features may also include anthropometric measurements, facial attributes, cloth color, pants color, and other apparel (e.g., glasses, hats, and the like). The extracted features may be stored in association with the non-visual identifier, the location and at time for future reference and analysis (e.g., as a record in object information 134). In embodiments, when the same non-visual identifier is received by sensor 29-2 at exit 214 of queue 210, the training module extracts another set of features of object 212. This provides an advantage of building a more comprehensive representation of object 212 so that training of the vision algorithms is more reliable. For example, the vision algorithm may be an Adaboost machine learning algorithm that incorporates weaker object classifiers to build strong overall classifiers. The extracted features of the captured objects can used by the Adaboost learning algorithm as the "weak classifiers" (e.g., object detection classifier using color, another detection classifier using size, etc.). A strong object detection classifier can be determined by incorporating the reliable features captured from the objects associated with non-visual identifiers (e.g., RFIDs).

Identifying object 212 using the non-visual identifier and capturing images of objects at particular locations in the queue (e.g., entrance 213 and/or exit 214) enables the training module to make accurate associations between captured images of object 212. These captured images are considered as the "near-groundtruth" detection (i.e., presumptively 100% accurate), which can provide reliable features a vision algorithm of the training module. For example, using the Adaboost learning algorithm, the training module can use features (e.g., size, color, etc.) of accurately localized objects (e.g., passengers in a queue) as positive examples to build strong detection classifiers for other objects (e.g., other passengers). Additionally, the training module can use surrounding areas of objects as negative examples (i.e., objects that are not passengers). This advantageously allows the monitoring system to track objects without requiring constrained camera angles and to track objects in a crowded queue, such as in an airport terminal in which passengers are carrying items such as luggage. Since the non-visual signals provide very accurate associations with passengers, the vision system is able to quickly localize the passengers in the designated areas (the camera field-of-view should be calibrated so that the system knows where the location of entry and exiting points.).

Once object 212 having a non-visual identifier is identified at entrance 213 of queue 210, the training module tracks the object as it traverses path 215 between grid locations (e.g., 0,0; 0,1, 0,2, 1,2; 2,2; 3,1, 4,1; 5,1, etc.) to reach exit 214 (i.e., location 7,9). The training module uses images of object 212 captured at each of the locations in path 215 traversed by object 212 to generate a feature transformation map (e.g., feature transformation map 136) which models the change of features at locations of grid 211. In embodiments, the training module builds relationships between each grid location such that the visual changes in captured images are predictable. Algorithms, such as Markov Random Field, may used to build the feature transformation map. Markov Random field is a spatial context aware network, where the relationship between each pair of adjacent locations is modeled by a probabilistic model (either parametric or non-parametric). The probability from one location to another determines how likely two observations from the two locations are from the same object based on the feature changes modeled previously.

In embodiments, visual changes in the captured images are modeled for adjacent grid locations. For example, an object at location 4,1 can be predicted either to move to one of adjacent locations 3,1; 3,2; 4,2; 5,1; and 5,2. Training module may, therefore, determine the visual change between location 4,1 and adjacent locations 3,1; 3,2; 4,2; 5,1; and 5,2. As such, in embodiments, objects 212 can be tracked based upon a limited set of information from adjacent locations.

As described above, the training module determines the feature transformation map based on a single object having a non-visual identifier traversing queue 210. It should be understood that path 215 represents one example of a path object 212 may take through queue 210. Different objects (e.g., individuals) may follow different and/or self-determined paths through queue 210. However, for the training module to obtain information describing all the possible paths though queue 210, the training module refines the feature transformation map can use information combined from numerous such objects. For example, features changes corresponding to a particular location traversed by training object may be averaged with previous information for that block. Additionally or alternatively, the training module can use statistical models to model feature changes. For example, a multi-Gaussian model can use feature changes modeled by a mixture of Gaussian distributions, and the distributions with the highest sample sizes will be taken as the final representation of the feature changes. As another example, a non-parametric model, Kernel density estimation can be used in which each feature change sample contributes in a small neighborhood of the feature space, and finally a non-parameter distribution of the feature changes can be constructed.

As described above, the feature transformation map models the change of the features instead of modeling the actual feature values. In embodiments, the feature transformation map is a spatial context aware network that defines a relationship between the features at locations within grid 212. Since spatial locations refer to the absolute subject location in the image field-of-view, the feature transformation map is not affected by the change of the queue. In embodiments, the feature transformation map represents features at a location as they are affected by features at locations proximate (e.g. adjacent) to the location. Notably, two locations may have the same features observed but, based on their neighboring locations. However, the feature transformation map would have different relationship between the features and their respective proximate locations such that the features captured at the two locations can be identified as different objects.

Referring still to FIG. 2, in the case when object 212 enters queue 210 without a non-visual identifier, tracking module (e.g., tracking module 112 of monitoring application 102 executed by computing system 12) uses the feature transformation map generated by the training module to track object 212 as it moves through 210 from entrance 213 to exit 214. Because visual tracking is performed using the feature transformation map, which is based on accurate changes in features obtained from known training objects, the tracking application reliably tracks object 212 by adjusting features extracted from captured images based on the location of the object. In addition, the feature transformation map assists the tracking module by providing prior information on how features change along path 215.

Beneficially, aspects of the invention allow high-level activity pattern analysis of queue 210 to be performed. For example, information obtained from reliably tracking objects enables estimates of the average moving speed and the waiting time of queue 210. Another application would be detecting the anxiousness of the passengers waiting in the queue by tracking individual passengers and detecting their shifts between adjacent locations while waiting idle in queue 210.

Figure 3:
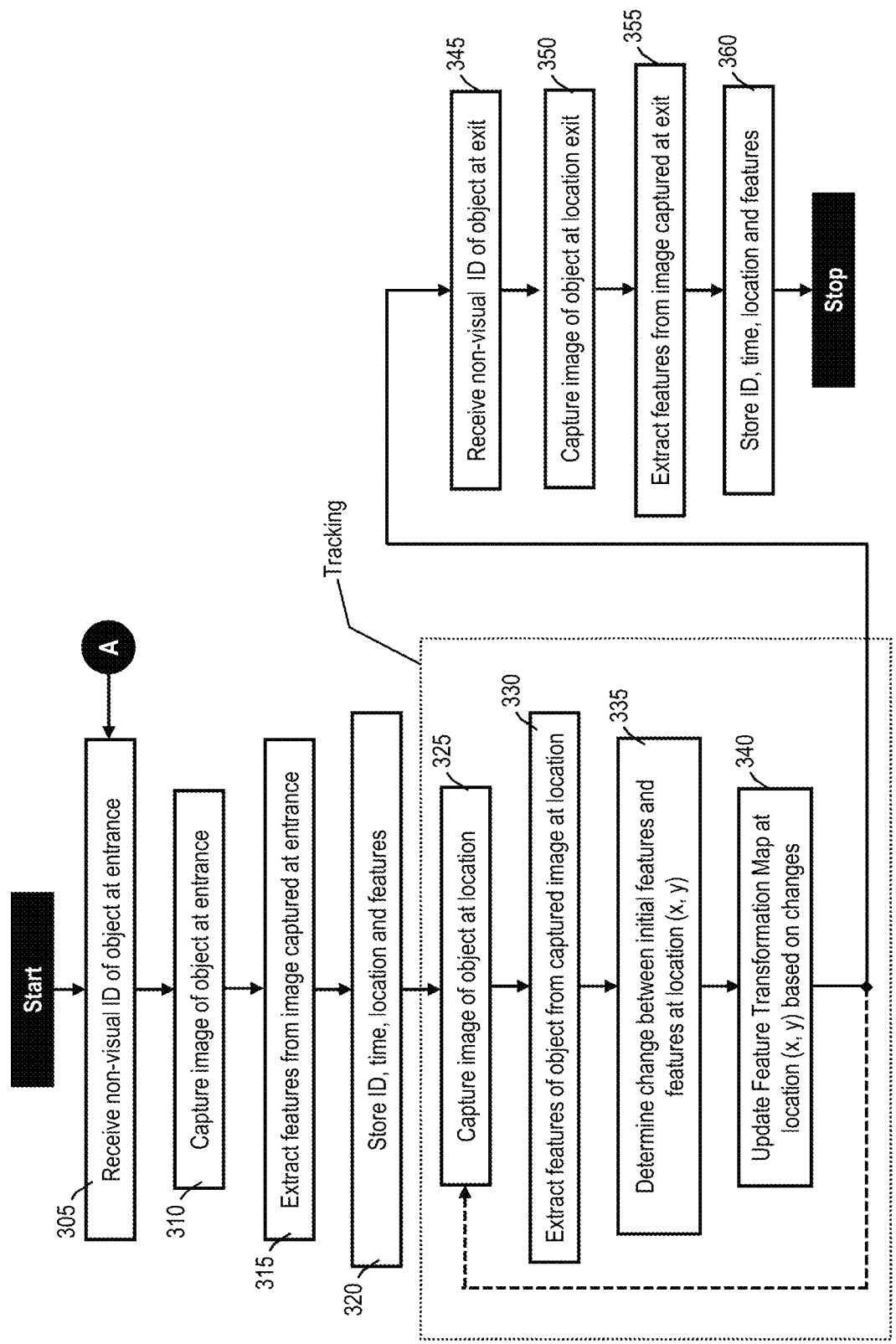
FIG. 3 shows an exemplary flow for generating a feature transformation map in accordance with aspects of the invention.
Figure 4:
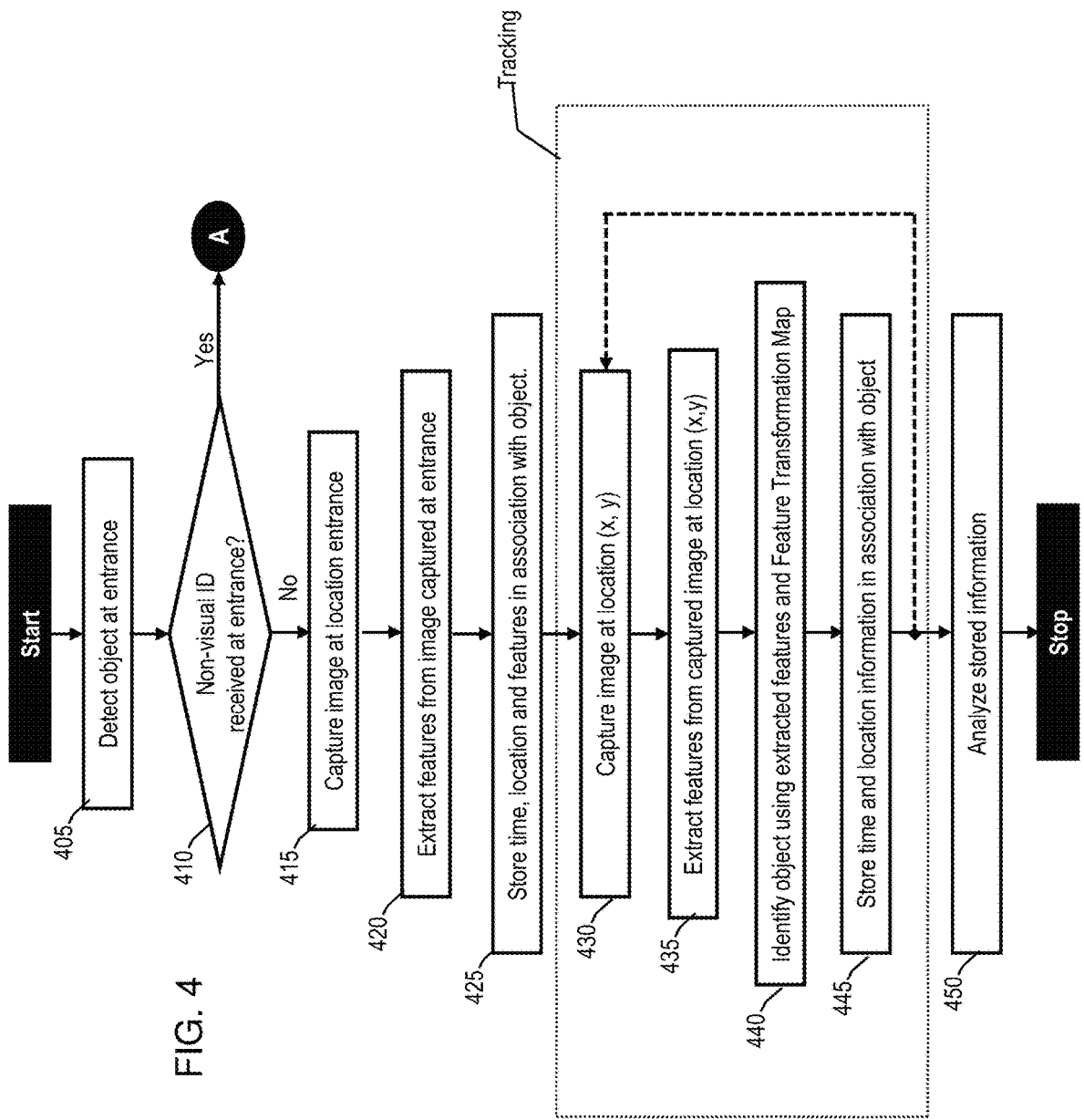
FIG. 4 shows an exemplary flow for monitoring a queue in accordance with aspects of the invention.

FIGS. 3 and 4 show exemplary flows for performing aspects of the present invention. The steps of FIGS. 3 and 4 may be implemented in the environments of FIGS. 1 and 2, for example. The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIGS. 1 and 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disc-read/write (CD-R/W) and DVD.

FIG. 3 shows an exemplary flow for generating a feature transformation map in accordance with aspects of the invention. The feature transformation map (e.g., feature transformation map 136) is generated based on tracking objects (e.g., object 212) having non-visual indicators that allow for accurate identification of the objects within a queue (e.g., queue 210). The feature transformation map provide an accurate model of changes in features extracted from captured images of the objects as they move from location to location in the queue. Using the feature transformation map, objects without non-visual indicators can be accurately tracked since changes in features extracted from captured images of the objects without non-visual indicators can be accurately predicted.

At step 305, a monitoring system (e.g., computing system 12 executing monitoring application 102 and/or training module 110) receives a non-visual identifier from an object at an entrance (e.g., entrance 213) of a queue being monitored (e.g., queue 210) using a sensor (e.g., sensor 29-1). The monitoring system can detect the non-visual identifier automatically (e.g., by detecting a device, such as a RFID) or manually (e.g., by a person manually triggering a scanner).

At step 310, the monitoring system captures an image of the object at the entrance using an image capture device (e.g., image capture device 30-1). At step 315, the monitoring system extracts features of the object from the image captured in step 310. Features may include, for example, size, shape, and color information. In embodiments where objects are people, the features may further include anthropometric measurements, facial attributes, cloth color, pants color, other apparel (e.g., glasses, hats, and the like), etc. At step, 320, the monitoring system may store the non-visual identifier received at step 305 along with the location, time and/or extracted features (e.g., as a record in object information 134) from step 315.

As the object travels through the queue, the monitoring system tracks the object. More specifically, at step 325, the monitoring system captures an image of the object having the non-visual identifier a location in the queue (e.g., location 0,1). At step 330, the monitoring system extracts features from the captured image. At step 335, the monitoring system determines the changes in features between the object's current location (e.g., location 0,1) and its previous location (e.g., location 0,0). At step 340, the monitoring system updates the feature transformation map (e.g., feature transformation map 136) to include the change in features between the previous location and the current location determined at step 335. For example, the feature transformation map may include information associating the two locations (e.g., 0,0:0,1) and recording the change in one or more features (e.g., height, width, colors) for the association. In embodiments, updating the feature transformation map includes combining the changes with previous information in the feature transformation map. For example, the data obtained from the current object may be averaged with all previous objects. Alternatively, the combination can be a moving average. Once new features of the same object are observed in consecutive frames from two neighboring locations, their corresponding feature change can be computed. This new feature change will be used to update the corresponding location-to-location relationship (e.g., a link defined in a Markov Random Field). For example, a weighted average can be determined based on historical data for that location-to-location relationship and this new observed feature change data. Other methods, such as mixture of Gaussian models, can be used as well.

At step 345, the monitoring system receives the non-visual identifier from the object at the exit (e.g., exit 314) of the queue using a sensor (e.g., sensor 29-2). At step 350, the monitoring system captures an image of the object sensed at step 345 at the exit using an image capture device (e.g., image capture device 30-6). At step 355, the monitoring system extracts features of the object from the image captured in step 350. At step, 360, the monitoring system may record the non-visual identifier along with the location, time and/or extracted features. The information captured at the exit can be treated as the same as the information captured at the entry point and used to augment the feature representation of the same object. By doing so, the information collected at the exit can be used to build more reliable location-to-location feature change models. That is, by obtaining accurate, reliable features of an object at both the entry and exit of a queue, feature changes can be determined going forward and backward between locations in the queue to build more reliable feature transition map.

Upon completion of the process illustrated in FIG. 3, the training module has updated the feature transformation map, which can be used to track other objects in the queue. Notably, while the process above is described for a single object possessing a non-visual identifier, it may be performed in an active queue in which other objects are traversing the queue.

FIG. 4 shows an exemplary flow for monitoring a queue in accordance with aspects of the invention. From the process describe above in FIG. 3, the monitoring system provides the feature transformation map, which accurately models changes in features of objects as they move through the queue. Based on the feature transformation map, the monitoring system can visually track other objects with accuracy in crowded conditions.

At step 405, the monitoring system (e.g., computer system 12 executing monitoring application 102 and tracking module 112) detects an object (e.g., object 212) at an entrance (e.g. entrance 213) of a queue (e.g., 210) that is being monitored. At step 410, the monitoring system determines whether a non-visual identifier is received at the entrance (e.g., by sensor 29-1). If a non-visual identifier is received, the monitoring system executes a training module (e.g., training module 110) to update the feature transformation map (e.g., feature transformation map 136). In such case, the monitoring system enters the process of FIG. 3 at step 305.

If, at step 405, the monitoring system does not receive a non-visual identifier, at step 415, the monitoring system captures an image of the object detected at the entrance (e.g., entrance 213 using image capture device 30-1) at step 405. At step 420, the monitoring system extracts features of the object from the image captured in step 415. At step, 425, the monitoring system may store an identifier along with the location, time and/or extracted features (e.g., as a record in object information 134) at step 420.

As the object travels through the grid, the monitoring system tracks the object by iteratively capturing images of the object at locations in the queue, extracting features from each captured image, and identifying the object using the extracted features and the feature transformation map. More specifically, at step 430, the monitoring system captures an image of the object at a location in the queue (e.g., location 0,1). At step 435, the monitoring system extracts features from the image captured in step 430. At step 440, the monitoring system identifies the object using the extracted features and the feature transformation map. At step 445, the monitoring system stores the time, location of the tracked object (e.g., as a record in object information 134.) As shown in FIG. 4, the monitoring system performs step 417 . . . 428 iteratively for each location of the queue traversed by the object. For example, at the entry point of the queue (e.g., location 0,0), an image of an object is captured on video and its features are also extracted accordingly. In next frame of the video, features are extracted from this location (location 0,0) and all its neighboring locations (e.g., locations 0,1; 1,0; and 1,1), and feature changes between the current location where the object was observed and its neighboring locations are estimated. Then, the feature changes are fed into the models of the feature transformation map, which was learned based on historical data (i.e., previously tracked objects having non-visual identifiers). If a strong link is found between the current location and one of its neighbors (i.e., a high probability returned by fitting the feature change value to a corresponding Markov Random Field), the monitoring system determines that the same object moved from the first location to that neighboring location.

At step 450, the monitoring system analyzes the information stored in step 445. That is, as a result of the process shown in FIG. 4, the tracking module generates records tracking the object's path through the queue and the time the object spent at different locations in the queue before exiting. Based on this information, the monitoring system can perform pattern analysis of the queue to determine characteristics of the queue, such as an average moving speed of objects in the queue, average standing time of objects at locations in the queue, average waiting time of objects in the queue. For example, in a transport hub, a theme park, a stadium, etc., the monitoring system can correlate the determined characteristics with an anxiousness level of individuals waiting in a queue. In a queue of motor vehicles, the monitoring system can use the determined characteristics to measure congestion levels and monitor the behavior of individual vehicles. Further, based on the determined characteristics, the monitoring system can provide alert messages to an operator (e.g., when waiting time, anxiousness level, or congestion level exceed predetermined thresholds).

The process shown in FIG. 4 describes tracking a single object. However, by using the feature transformation map generated from accurate information obtained from an object having a non-visual identifier, the monitoring system can accurately track other objects in the queue that do not possess a non-visual identifier using only their visual features. Thus, the monitoring system can visually track multiple objects simultaneously moving in a crowded queue in which purely visual tracking would otherwise be inaccurate.

FIG. 5 shows exemplary data structures representing features extracted from an image captured in a queue in accordance with aspects of the invention. More specifically, data structure 502 represents an exemplary data structure for storing feature information extracted from an image captured by an image capture device (e.g., image capture device 30-1) at a first location (e.g., entrance 313 at location 0,0) of a queue (e.g., queue 310). Data structure 502 includes an identifier of an object (e.g., object 212) from which the image was captured (e.g., object A). In the case where the object possesses a non-visual identifier, this may be used as the identifier of the data structure. In the case where the object does not possess a non-visual identifier, the monitoring system may assign an identifier based on a naming schema. Additionally, in embodiments, data structure 502 includes a timestamp of the time a corresponding image was captured. Further, column 503 of data structure 502 includes identifiers f1 . . . fx of predefined features extracted from an image. Column 504 of data structure 502 records information representing the features extracted from the image corresponding to the identifiers f1 . . . fx in column 503. By detecting differences in extracted features (e.g. f1 . . . fx) between adjacent locations (e.g., location 1,2 and location 2,1), a training module (e.g., training module 110) can create and update a feature transformation map (e.g., feature transformation map 136) to accurately model these changes. Further, detecting differences in extracted features (e.g. f1 . . . fx) between adjacent locations (e.g., location 1,2 and location 2,1), a tracking module (e.g., tracking module 112) can accurately track an object in a queue using the feature transformation map.

Data structures 507 . . . 517 include similar information to that included in data structure 502 for different locations for the same object (e.g., object A) captured at different locations in the queue. For example, data structure 507 includes information extracted from an image captured a second location (e.g., location 1, 2 of queue 310). Data structure 512 includes information extracted from an image captured at a third location (e.g., location 2,1 of queue 310). And data structure 517 includes information extracted from an image captured at a fourth location (e.g., exit 314 at location 9,7 of queue 310). While FIG. 5 only illustrates features extracted from a few locations, according to aspects of the invention, such data structures for each location along a path (e.g., path 215) in the queue are created and stored by the monitoring system.

FIG. 6 shows exemplary data structures representing an exemplary feature transformation map 136 in accordance with aspects of the invention. Feature transformation map 136 associates each location of a grid (e.g., grid 211) with adjacent locations in the queue (e.g., queue 210). Columns 602 and 605 show an exemplary association for a limited set of information associating a particular location (e.g., location 1,2) and its five adjacent locations, (e.g., 1,1; 0,2; 1,1; 2,1; 2,2). Columns 608, 614, and 612 represent different predefined features f1, f2, f3 extracted from captured images and columns 611, 617, and 623 represent respective changes in those features for each associated set of locations in column 602 and adjacent locations 605. The value of the changes in columns 611, 617 and 623 may be combined from number of different objects having non-visual identifiers that have been tracked at different times. For example, column 608 includes a predefined feature f1 (e.g., red channel color) extracted from captured images of an objects (e.g., object 212) and associates it with column 611, which includes a change in that feature between the corresponding location in column 602 (e.g., 1,2) and adjacent location (e.g., 2,1) in column 605. The information in column 611 may be values or pointers to values, algorithms, and/or datasets. Likewise, column pairs 614, 617 and 620, 623 include additional predefined features f2, f3 (e.g., green channel color and blue color channel) extracted from the captured images of an object (e.g., object 212) and associate them with corresponding changes in those feature between the corresponding location in column 602 and adjacent location in column 605. While feature transformation map 136 in FIG. 6 only includes three sets of extracted features f1, f2, f3, it should be understood that embodiments may include additional entries recording additional features as described hereinabove.

FIG. 7 shows exemplary histogram features extracted from an image captured in a queue in accordance with aspects of the invention. More specifically, scene 802 represents an image captured by an image capture device (e.g., image capture device 30-1) of an individual 805 at a first location 807 in a queue 810. Box 812 represents a bounding box determined by a visual monitoring tracking system (e.g., computer system 12 executing monitoring application 110) when detecting individual 805 in scene 802. Based in the image captured of scene 802, the monitoring system may extract features of individual 805. For example, based on the bounding box 812, the monitoring system can determine a relative height and width of individual 805. Additionally, as depicted in histograms 815, 817, and 819, the monitoring system may determine color values of individual in several color channels (e.g., red, green, blue) inside the bounding box 812.

FIG. 8 shows exemplary histogram features extracted from an image captured in a queue in accordance with aspects of the invention. By comparison to FIG. 7, scene 820 represents an image captured by an image capture device of individual 805 after moving to a second location 822 in queue 810. Box 812' represents a bounding box determined by a visual monitoring tracking system when detecting individual 812 in scene 820. As evident from FIG. 8, the location and orientation of individual 805 has changed. Likewise, the size and position of box 812' is different than that of box 812.

As with scene 802, based in the image captured of scene 820, the monitoring system may extract features of the individual. For example, based on the box 812', the monitoring system can determine a relative height and width of individual 805. Additionally, as depicted in histograms 815', 817', and 819', the monitoring system may determine color values of individual in several color channels (e.g., red, green, blue) inside the bounding box 812'.

Figure 9:
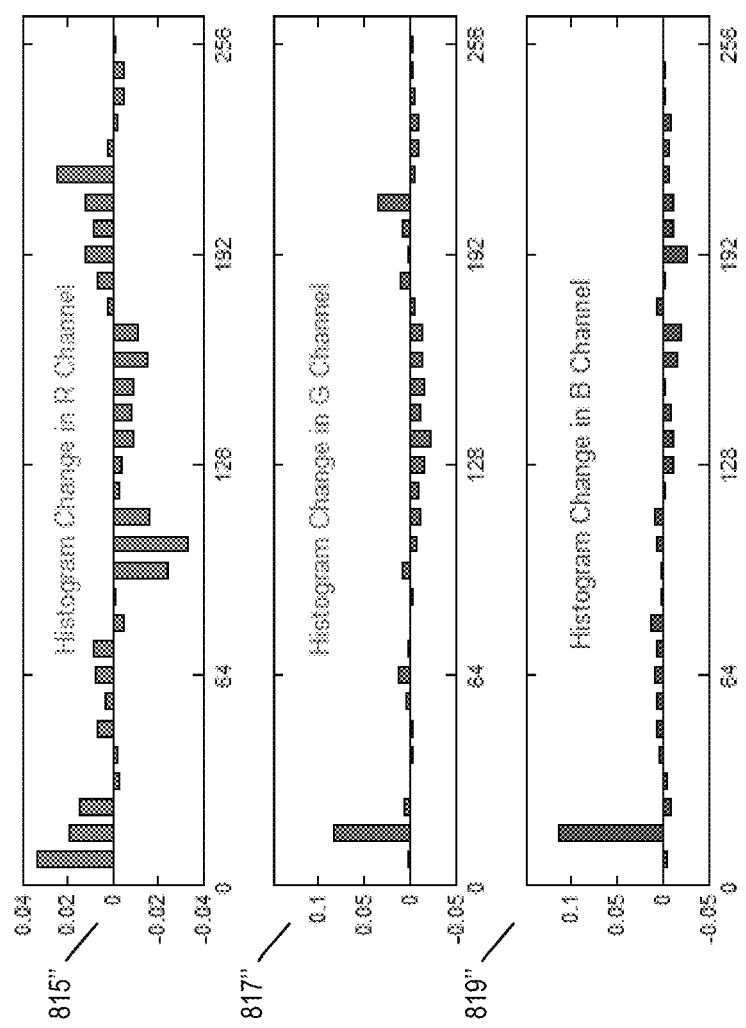
FIG. 9 shows exemplary difference of histogram features in accordance with aspects of the invention.

FIG. 9 shows exemplary differences of histogram features in accordance with aspects of the invention. That is, FIG. 9 represents the histograms 815", 817", and 819" determined by the monitoring system from the color histograms channels 815, 817, and 819 and 815', 817', and 819', respectively. Each of the histograms 815", 817", and 819" may correspond to a feature (e.g., f1, f2, f3) stored in a feature transformation map (e.g., feature transformation map 163) and the values of the histograms 815", 817", and 819" may represent a respective change in that feature. Thus, when individual in FIG. 8 moves from location 1, 2 to location 2,1, the value of histogram 815" may be stored in column 611 associated with feature f1 of location 1,2 in column 602 and adjacent location 2,1 in column 605. Likewise, the value of histogram 817" may be stored in column 617 associated with feature f2 of location 1,2 in column 602 and adjacent location 2,1 in column 605. And the value of histogram 819" may be stored in column 623 associated with feature f3 of location 1,2 in column 602 and adjacent location 2,1 in column 605. Based on this information, subsequent individuals in queue 810 from location 1,2 to location 2,1 can be expected to have similar changes in the features extracted from image captures. Accordingly, applying the expected changes to images captured from individuals in a queue provides improved accuracy in determining their movements between locations such that each individual entering the queue can be visually tracked.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:
1. A method for monitoring a queue, comprising:
visually tracking another object in a queue based on transformations of at least one predefined feature extracted from images of an object possessing a non-visual identifier; and
generating a feature transformation map to model changes of the at least one predefined feature at locations throughout the queue so that visual changes of the object possessing the non-visual identifier are predict- able and that the another object which does not possess the non-visual identifier can be identified within the queue.

2. The method of claim 1, wherein the transformations comprise models of changes in the at least one predefined feature between segments of the queue.

3. The method of claim 1, wherein the locations throughout the queue include an entrance of the queue and an exit of the queue.

4. The method of claim 1, wherein the visually tracking the another object is based on images of the another object at segments of the queue.

5. The method of claim 1, further comprising based on the at least one predefined feature extracted from images of the object possessing the non-visual identifier at one of predefined locations, visually tracking the object possessing the non-visual identifier in the queue so that the at least one predefined feature is classified.

6. The method of claim 5, further comprising determining a change in the at least one predefined feature extracted from images of the object possessing the non-visual identifier captured at adjacent segments of the queue.

7. The method of claim 6, further comprising updating the feature transformation map based on the determined change in the at least one predefined feature between the adjacent segments.

8. The method of claim 7, wherein the feature transformation map associates the adjacent segments with models of changes in the at least one predefined feature between the adjacent segments for a plurality of objects possessing non-visual identifiers for predicting the plurality of objects later in the queue.

9. The method of claim 1, wherein the queue is a structured area defining at least one path.

10. The method of claim 9, further comprising visually tracking the object possessing the non-visual identifier along a first path of a plurality of paths through the queue by classifying as a positive example the at least one predefined feature while classifying a surrounding area of the object possessing the non-visual identifier as a negative example to localize the object possessing the non-visual identifier within the queue among the another object.

11. The method of claim 1, wherein the queue is divided into a virtual grid comprised of segments, each segment of the grid defining a location in the queue, so that as the object possessing the non-visual identifier travels through the grid, the monitoring system tracks the object possessing the non-visual identifier by iteratively capturing images of the object at locations in the queue, extracting features from each captured image, and identifying the object possessing the non-visual identifier using the extracted features and the feature transformation map.

12. The method of claim 11, further comprising determining changes in the at least one predefined feature extracted from images of the object possessing the non-visual identifier captured at each of a plurality of adjacent segments of the virtual grid traversed by the object along a first path.

13. The method of claim 12, further comprising updating models of changes in the at least one predefined feature for each of the adjacent segments based on the determined changes.

14. A system implemented in hardware for visually monitoring a queue, comprising:
a computing device communicatively linked to one or more non-visual sensors and one or more image capture devices, wherein the one or more computing devices based on a determination that one or more non-visual sensors did not receive a non-visual identifier from an object, visually track the object in a queue using a feature transformation map, wherein the feature transformation map models changes of a predefined feature of the object at locations throughout the queue so that visual changes in the object are predictable.

15. The system of claim 14, wherein visually tracking the object in the queue comprises iteratively:
capturing a first image of the object at a location in the queue;
extracting a first plurality of features from the first image captured at the location; and
identifying the object using the first plurality of features, a second plurality of features extracted from another image captured at an adjacent location in the queue, and the feature transformation map.

16. The system of claim 14, wherein the feature transformation map associates a plurality of adjacent locations in the queue with respective changes in a plurality of features extracted from images of a plurality of objects possessing non-visual identifiers.

17. The system of claim 16, wherein the feature transformation map models visual changes for a plurality of predefined features for the adjacent locations of the queue.

18. A computer program product for monitoring a queue, the computer program product comprising:
one or more computer-readable, tangible storage devices;
program instructions, stored on at least one of the one or more storage devices, that determine whether a non-visual sensor received a non-visual identifier from an object;
program instructions, stored on at least one of the one or more storage devices, that visually track the object in a queue using a feature transformation map; and
program instructions, stored on at least one of the one or more storage devices, that predict visual changes in the object using the feature transformation map by modeling changes of a predefined feature associated with the object at locations throughout the queue so that another object can be identified and localized within the queue.

19. The computer program product of claim 18, wherein the feature transformation map is a data structure associating each location of the grid with one or more adjacent locations of the grid and corresponding changes in visual features between the associated locations and adjacent locations.

20. The computer program product of claim 18, further comprising program instructions stored on at least one of the one or more storage devices that determine a waiting time of the queue.

* * * * *